United States Patent
Yamada et al.

(10) Patent No.: US 7,040,702 B2
(45) Date of Patent: May 9, 2006

(54) TIP-UP VEHICLE SEAT

(75) Inventors: Takurou Yamada, Tochigi-ken (JP);
Masayuki Takakura, Saitama-ken (JP);
Takahiro Ito, Saitama-ken (JP); Seiji Waku, Saitama-ken (JP)

(73) Assignees: TS Tech Co., Ltd., Saitama-ken (JP);
Honda Giken Kogyo Kabushiki Kaisha, Tokyo (JP)

( * ) Notice: Subject to any disclaimer, the term of this patent is extended or adjusted under 35 U.S.C. 154(b) by 395 days.

(21) Appl. No.: 10/416,545

(22) PCT Filed: Jun. 10, 2002

(86) PCT No.: PCT/JP02/05734

§ 371 (c)(1),
(2), (4) Date: May 13, 2003

(87) PCT Pub. No.: WO02/100679

PCT Pub. Date: Dec. 19, 2002

(65) Prior Publication Data

US 2004/0032155 A1    Feb. 19, 2004

(30) Foreign Application Priority Data

Jun. 11, 2001   (JP) ............................ 2001-175916

(51) Int. Cl.
*A47C 1/02*   (2006.01)

(52) U.S. Cl. .................. 297/331; 297/335; 296/65.01; 296/65.18

(58) Field of Classification Search ............... 297/331, 297/335, 336, 337; 296/65.01, 65.05, 65.18
See application file for complete search history.

(56) References Cited

U.S. PATENT DOCUMENTS

| | | | | |
|---|---|---|---|---|
| 5,195,795 A * | 3/1993 | Cannera et al. | .......... | 296/65.09 |
| 6,231,101 B1 * | 5/2001 | Kamida et al. | ............... | 296/63 |
| 6,460,929 B1 * | 10/2002 | Kamida | .................. | 297/344.1 |
| 6,902,236 B1 * | 6/2005 | Tame | ......................... | 297/335 |

* cited by examiner

*Primary Examiner*—Laurie K. Cranmer
(74) *Attorney, Agent, or Firm*—Browdy and Neimark, PLLC

(57) ABSTRACT

A tip-up vehicle seat comprises a seat back (11) attached to a vehicle body, a seat bottom (14) displaceable between a retracted position and a available position, a leg member (17) displaceable between a retracted position and a support position, a lock mechanism (18) arranged to hold the seat bottom at the retracted position. The lock mechanism (18) is connected to the leg member (17) through a wire cable (43) so that the lock mechanism (18) is unlocked by rotational movement of the leg member (17) from the retracted position toward the support position to release the restriction to the seat bottom (14).

12 Claims, 4 Drawing Sheets

TIP-UP VEHICLE SEAT

TECHNICAL FIELD OF THE INVENTION

The present invention relates to a tip-up vehicle seat, and more particularly, relates to a lock mechanism of a tip-up seat.

BACKGROUND ART OF THE INVENTION

Japanese Utility Model Application Laid-Open No. 4-14536 discloses a tip-up vehicle seat which includes a seat back attached to a vehicle body, a seat bottom rotatably attached to the seat back, and a leg member rotatably attached to the seat bottom. The seat bottom is displaceable between a retracted position where it becomes substantially in parallel with the seat back and an available or horizontal position where it becomes approximately at right angles with the seat back. The leg member is displaceable between a retracted position where it becomes substantially in parallel with the seat bottom and a support position where it becomes approximately at right angles with the seat bottom. The seat bottom is held at the retracted position with a lock mechanism.

For using this vehicle seat, three operations, that is, a first operation of moving the leg member to the support position, a second operation of unlocking the lock mechanism, and a third operation of moving the seat bottom to the available position are necessary. And, the leg member should always be moved to the support position before the seat bottom is moved to the available position. If anyone sits on the seat bottom at the available position while the leg member is not positioned at the support position, the seat bottom may be deformed by large load. Thus, in using, a conventional seat is delicate and troublesome.

BRIEF SUMMARY OF THE INVENTION

It is an object of the present invention to provide a tip-up vehicle seat which has an improved operability and where no wrong operation is caused. In order to achieve this object, a lock mechanism for holding a seat bottom at the retracted position is arranged to be released by a movement from a retracted position to a support position of a leg member.

Furthermore, it is another object of the present invention to provide improved attaching means for attaching a leg member and connecting means which transmit the movement of the leg member to the lock mechanism.

BEST MODE FOR CARRYING OUT THE INVENTION

Figure 1:
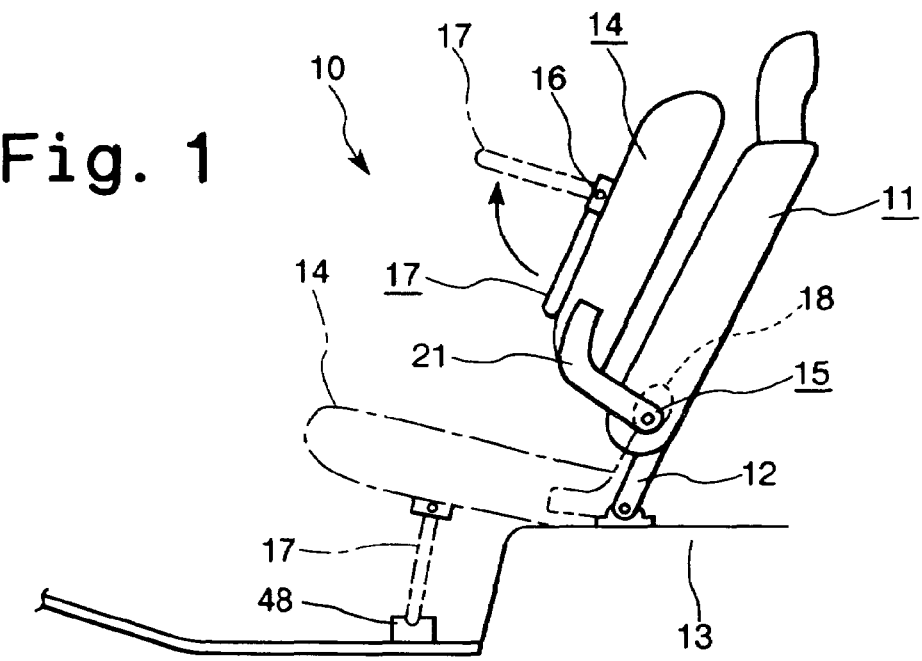
FIG. 1 is a side view of a tip-up vehicle seat according to the present invention.
Figure 2:
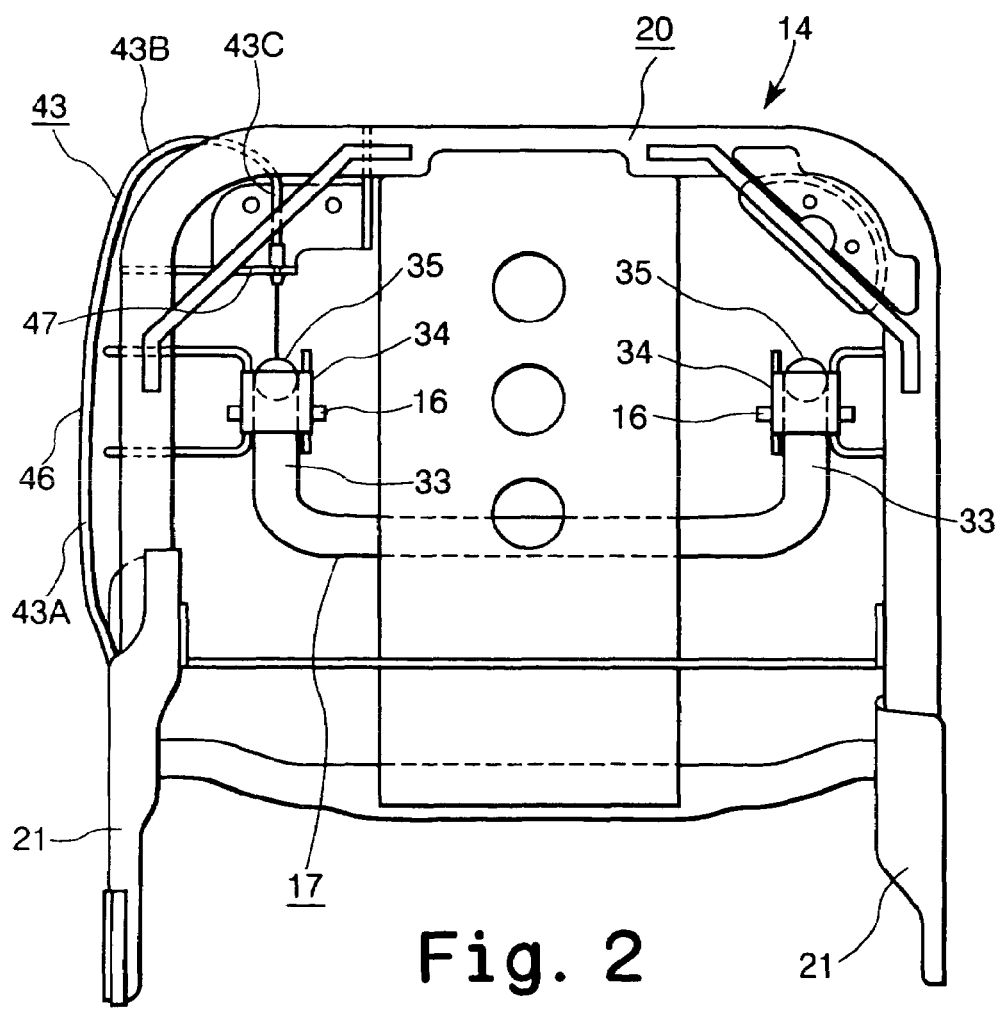
FIG. 2 is a plan view of a framework of a seat bottom of the vehicle seat.
Figure 3:
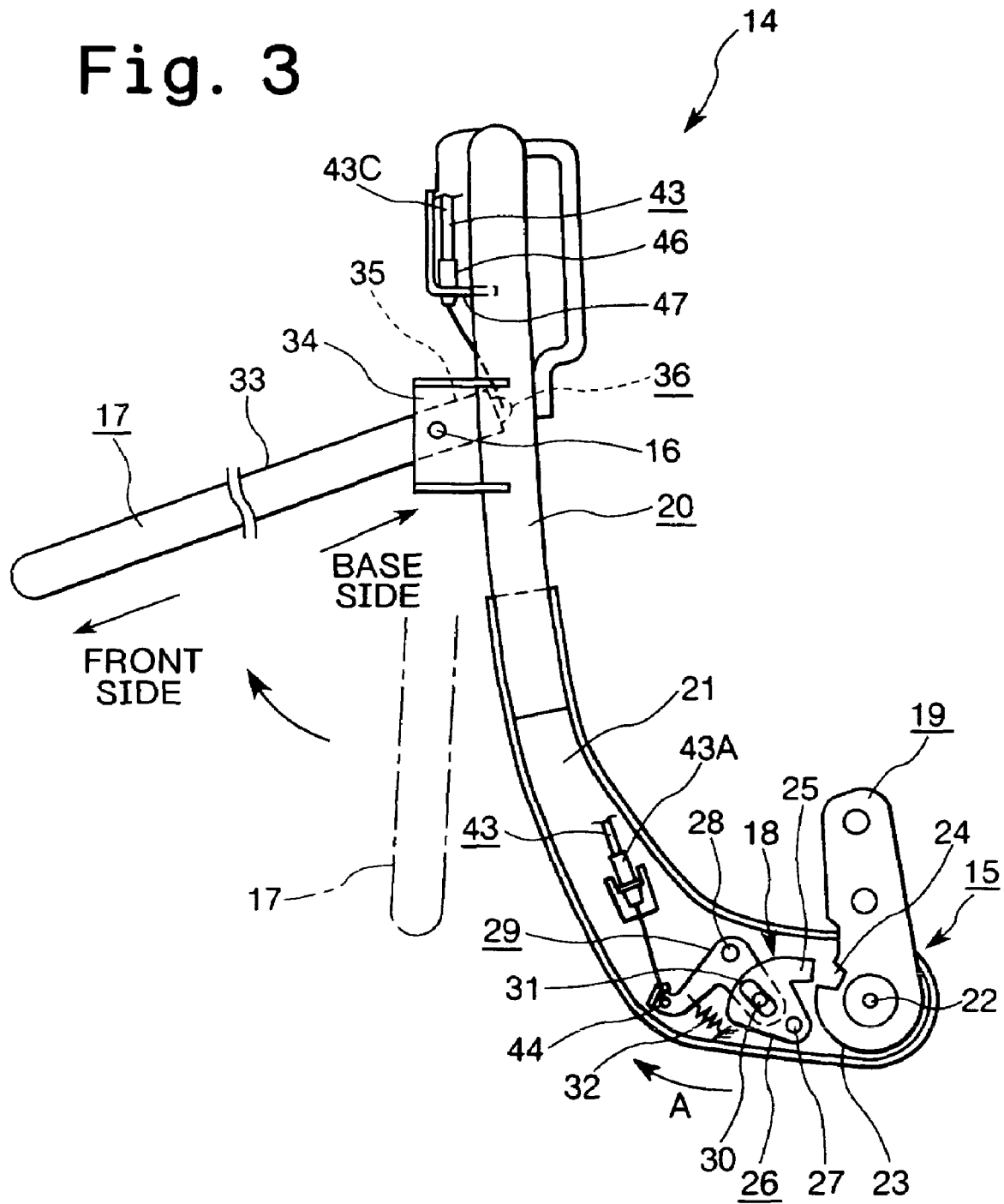
FIG. 3 is a side view of the framework of the seat bottom.
Figure 4:
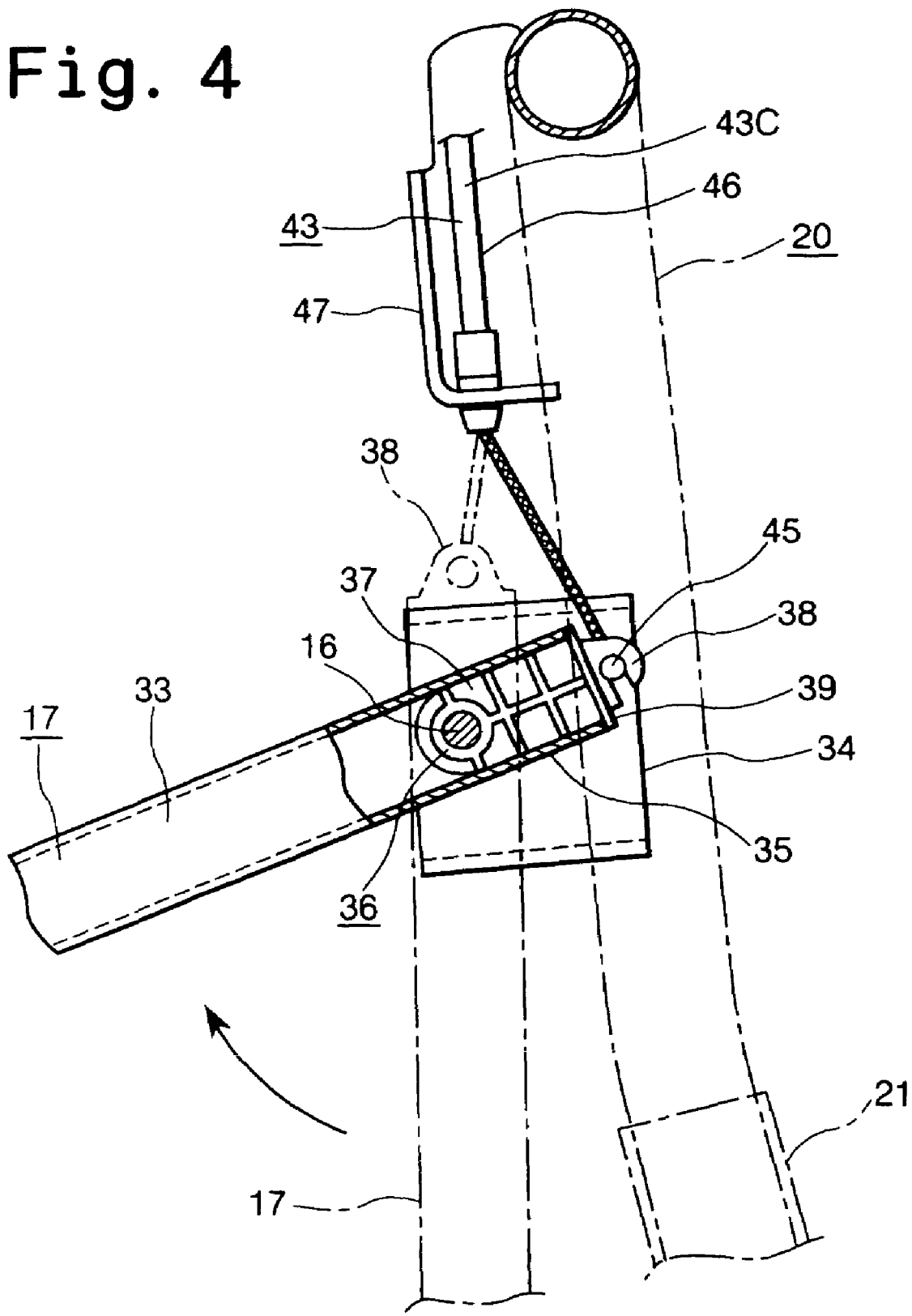
FIG. 4 is a partial vertical sectional side view showing fastener means for connecting a wire cable and a leg member.
Figure 5:
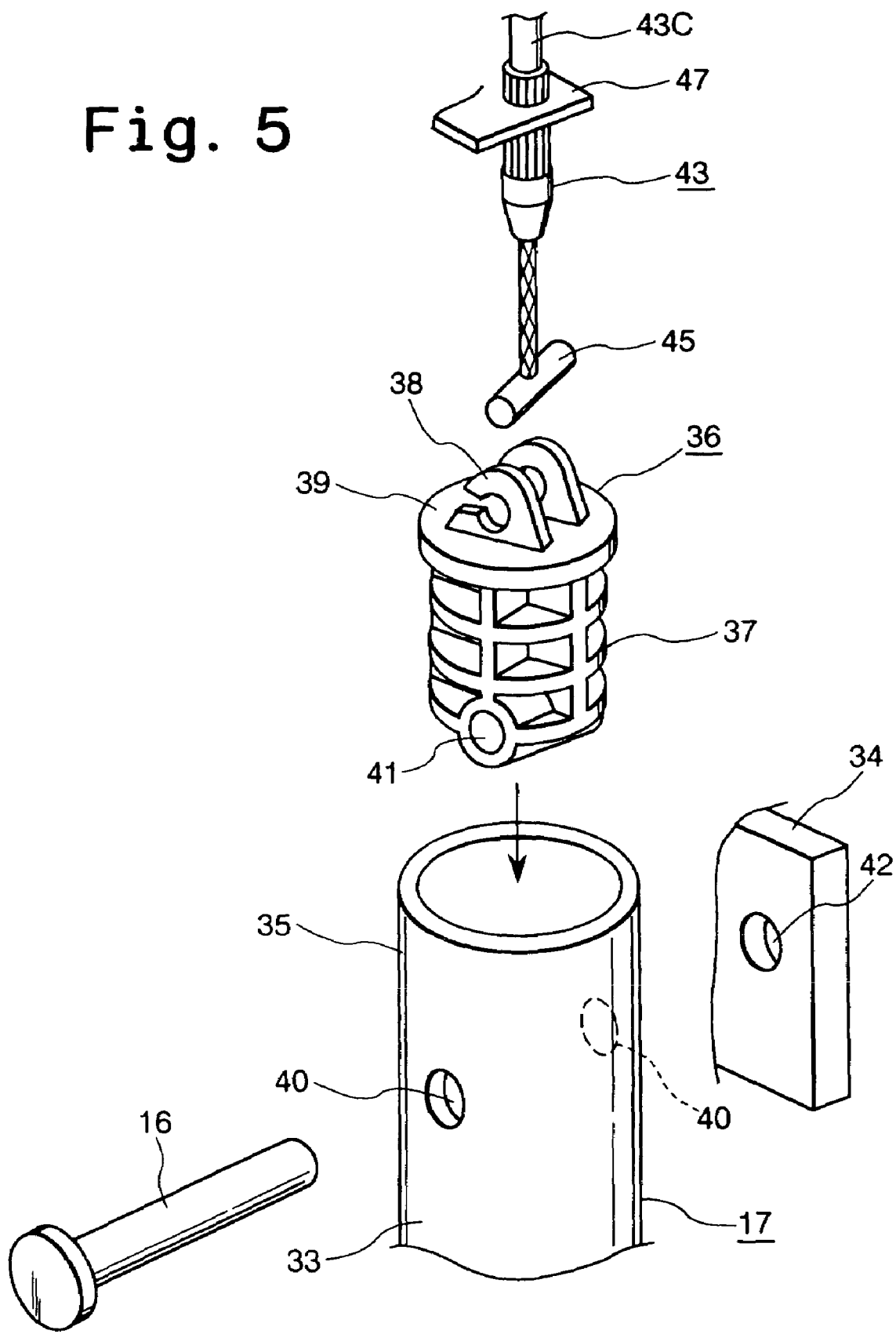
FIG. 5 is an exploded illustration of the fastener means.

One embodiment of the present invention will be described by referring to drawings. A tip-up vehicle seat 10 according to the present invention includes a seat back 11 attached to a vehicle body 13 through a stay 12 and a retractable seat bottom 14 rotatably attached to the seat back 12 by support means 15. The seat bottom 14 is displaceable between a retracted position where it becomes substantially in parallel with the seat back 11 and an available or horizontal position where it becomes approximately at right angles to the seat back 11.

At the under surface of the seat bottom 14, a retractable leg member 17 is rotatably attached by a mounting shaft 16. The leg member 17 is displaceable between a retracted position where it becomes substantially in parallel with the seat bottom 14 and a support position where it becomes approximately at a right angle to the seat bottom 14.

The support means 15 has a lock mechanism 18 for holding the seat bottom 14 at the retracted position. The lock mechanism 18 becomes in an unlocked state in response to the movement of the leg member 17 from the retracted position to the support position so as to allow the seat bottom 14 to be displaced from the retracted position to the available position. When the leg member 17 is moved from the support position to the retracted position after the seat bottom 14 has been displaced from the available position to the retracted position, the lock mechanism 18 returns to a locked state and holds the seat bottom 14 at the retracted position.

The support means 15 has a back side bracket 19 fixed to a framework (not shown) of the back seat 11 and a bottom side bracket 21 fixed to a framework 20 of the seat bottom 14. Both brackets 19, 21 are rotatably pivoted to each other with a shaft 22. The lock mechanism 18 includes a circular arc part 23 formed at the base of the back side bracket 19 and an engaging lever 26 having a pawl 25 which is engageable with a recess 24 of the circular arc part 23. The engaging lever 26 is rotatably attached to the bottom side bracket 21 with a shaft 27. The lock mechanism 18 becomes in the locked state when the pawl 25 is engaged with the recess 24, and becomes in the unlocked state when the pawl 25 is separated from the recess 24.

The engaging lever 26 has an engaging hole 31. A release lever 29 is rotatably attached to the bottom side bracket 21 with a shaft 28 and has a pin 30 which is engaged with the hole 31. The rotation of the release lever 29 in a direction of the arrow A disengages the pawl 25 of the engaging lever 26 from the recess 24. A spring 32 is provided between the release lever 29 and the bottom side bracket 21 to urge the release lever 29 in an opposite direction of the arrow A.

The leg member 17 preferably comprises a U-shaped tubular frame. A pair of side legs 33, 33 of the leg member 17 are pivoted with the mounting shafts 16, 16 to mounting brackets 34, 34 which are fixed to the framework 20 of the seat bottom 14. The base side portions of the side legs 33, 33 are formed to be open end cylindrical parts 35, 35. An attaching tool 36 as attaching means is attached to one of the cylindrical parts 35, 35. The attaching tool 36 has an anchor 37 to be inserted into the cylindrical part 35, a hook 38, and a flange 39 between the anchor 37 and the hook 38. The anchor 37 has a shaft hole 41 to be aligned with mounting holes 40, 40 of the cylindrical part 35 when the flange 39 comes into contact with the tip end of the cylindrical part 35. The mounting shaft 16 which is inserted into the holes 40, 41 and 40, is also inserted into a hole 42 of the mounting bracket 34 to be fixed to the bracket 34.

Between the leg member 17 and the lock mechanism 18, connecting means 43 such as a wire cable or a rod is provided. The wire cable 43 has a first portion 43A extending toward the front side of the seat bottom 14 from the lock mechanism 18, a second portion 43B making a U-turn from the front end of the first portion 43A, and a third portion 43C extending toward the back side of the seat bottom 14 from one tip end of the second portion 43B. The second portion 43B is positioned at the front portion of the seat bottom 14, taking the mounting shaft 16 as a boundary. A cable head 44 of the first portion 43A is connected to the release lever 29 of the lock mechanism 18, and a cable head 45 of the third portion 43C is connected to the hook 38 of the attaching tool 36.

The framework 20 of the seat bottom 14 is provided with a holding member 47 to which one end of a flexible outer sheath 46 of the cable 43 is firmly fixed. The holding member 47 is positioned at the front portion of the framework 20, taking the mounting bracket 34 (mounting shaft 16) as a boundary, and the hook 38 is positioned ahead of the mounting shaft 16 on the base side of the side leg 33. Thus, the third portion 43C of the cable 43 is pulled from the front side toward the back side of the framework 20 by the movement of the leg member 17 from the retracted position to the support position.

The tip of the leg member 17 at the support position is held by a holding channel 48 fixed to the vehicle body 13.

The operation of the present invention will be described. In the tip-up state shown by the solid line in FIG. 1, when displacing the leg member 17 from the retracted position to the support position, the cable head 45 of the third portion 43C is moved from the front side to the back side of the framework 20, and the cable head 44 of the first portion 43A is moved from the back side to the front side of the framework 20, and the release lever 29 is rotated in the arrow A against the elasticity of the spring 32. Then, the engaging lever 26 is also rotated, and the pawl 25 of the engaging lever 26 is disengaged from the recess 24 of the back side bracket 19, and the lock mechanism 18 becomes in the unlocked sate. Next, when the seat bottom 14 is rotated from the retracted position to the available position, the leg member 17 is engaged with the holding channel 48 fixed to the vehicle body 13, and it becomes possible to sit down on the vehicle seat 10.

When the seat bottom 14 is moved from the available position to the retracted position and the leg member 17 is moved from the support position to the retracted position, the release lever 29 is restored in the opposite direction of the arrow A by the elasticity of the spring 32, and the pawl 25 of the engaging lever 26 is engaged with the recess 24 of the back side bracket 19, and therefore, the lock mechanism 18 returns to the locked state.

EFFECT OF THE INVENTION

The lock mechanism 18 is arranged to be unlocked in response to the rotation from the retracted position to the support position of the leg member 17, and therefore, such a situation where the seat bottom 14 is displaced to the available position without moving the leg member 17 to the support position can be prevented. Furthermore, the special operation for making the lock mechanism 18 in the unlocked state becomes unnecessary, and therefore, the set up operation of the tip-up seat becomes simple.

The attaching tool 36 as the attaching means of the present invention is attached to the leg member 17 with the mounting shaft 16 with which the leg member 17 is rotatably attached to the seat bottom 14, and therefore, the number of parts can be decreased.

The anchor 37 of the attaching tool 36 is inserted into the open end cylindrical part 35 of the leg member 17, and therefore, the assembly work becomes easy, and furthermore, the rattle between the attaching tool 36 and the leg member 37 can be prevented.

The shaft hole 41 of the attaching tool 36 is aligned with the mounting holes 40, 40 of the leg member 17 when the flange 39 of the attaching tool 36 comes into contact with the tip end of the cylindrical part 35 of the leg member 17, and therefore, the attachment to the leg member 17 of the attaching tool 36 becomes easy.

The leg member 17 is formed by a U-shaped tubular frame, and therefore, the open end cylindrical part 35 can easily be formed at the end of the leg member 17.

The connecting means 43 comprises a wire cable, and therefore, the connection between the leg member 17 and the lock mechanism 18 is easy.

The hook 38 of the attaching tool 36 is positioned on the base side of the side leg 33, taking the mounting shaft 16 as a boundary, and therefore, it is possible to position the third portion 43C of the wire cable 43 near the framework 20 of the seat bottom 14 so that the exposing to the outside of the third portion 43C is decreased to the utmost.

The wire cable 43 is arranged to make a U-turn at the front portion of the seat bottom 14, and therefore, it is possible to smoothly transmit the movement of the hook 38 which moves from the front side of the seat bottom 14 to the back side by the rotation of the leg member 17, to the lock mechanism 18 provided on the rear portion of the seat bottom 14.

The invention claimed is:

1. A tip-up vehicle seat comprising:
   a seat back attached to a vehicle body;
   a seat bottom rotatably attached to the seat back, said seat bottom being displaceable between a retracted position where the seat bottom is substantially parallel to the seat back and an available position where the seat bottom is approximately at a right angle with the seat back;
   a leg member rotatably attached to the seat bottom with a mounting shaft, said leg member being displaceable between a retracted position where the leg member becomes substantially parallel with said seat bottom and a support position where the leg member is approximately at a right angle with the seat bottom; and
   a lock mechanism arranged to hold the seat bottom at the retracted position;
   wherein said lock mechanism is connected to the leg member through connecting means so that when the leg member is displaced from the retracted position toward the support position, the lock mechanism is unlocked to permit rotation of the seat bottom into the available position from the retracted position.

2. The tip-up vehicle seat according to claim 1, further comprising attaching means which includes a hook to be engaged with one end of the connecting means, and an anchor to be attached to the leg member; wherein said anchor is attached to the leg member with the mounting shaft which rotatably attaches the leg member to the seat bottom.

3. The tip-up vehicle seat according to claim 2, wherein said connecting means comprises a wire cable.

4. The tip-up vehicle seat according to claim 3, wherein said hook of the attaching means is positioned between a framework of the seat bottom and the mounting shaft.

5. The tip-up vehicle seat according to claim 3 or 4, wherein said wire cable includes a first portion extending from the lock mechanism toward a front side of the seat bottom, a second portion making a U-turn from a front end of the first portion, and a third portion extending from one end of the second portion toward a back side of the seat bottom to be engaged with the hook of the attaching means; and said second portion is positioned in the front side of the seat bottom.

6. The tip-up vehicle seat according to claim 2, wherein said leg member includes an open end cylindrical part into which the anchor is inserted.

7. The tip-up vehicle seat according to claim 6, wherein said connecting means comprises a wire cable.

8. The tip-up vehicle seat according to claim 7, wherein said hook of the attaching means is positioned between a framework of the seat bottom and the mounting shaft.

9. The tip-up vehicle seat according to claim 7 or 8, wherein said wire cable includes a first portion extending from the lock mechanism toward a front side of the seat bottom, a second portion making a U-turn from a front end of the first portion, and a third portion extending from one end of the second portion toward a back side of the seat bottom to be engaged with the hook of the attaching means; and said second portion is positioned in the front side of the seat bottom.

10. The tip-up vehicle seat according to claim 6, wherein said attaching means includes a flange which is positioned between the anchor and the hook, and said flange comes into contact with a tip end of the open end cylindrical part.

11. The tip-up vehicle seat according to any one of claims 1, 2, 6, or 10, wherein said leg member comprises a U-shaped tubular frame.

12. The tip-up vehicle seat according to claim 11, wherein said connecting means comprises a wire cable.

* * * * *